(12) United States Patent
Komuta et al.

(10) Patent No.: US 12,314,898 B2
(45) Date of Patent: May 27, 2025

(54) WORK PLANNING SYSTEM AND WORK PLANNING METHOD

(71) Applicant: LOGISTEED, Ltd., Tokyo (JP)

(72) Inventors: Osamu Komuta, Tokyo (JP); Takashi Inoue, Tokyo (JP); Atsushi Yanagisawa, Tokyo (JP)

(73) Assignee: LOGISTEED, Ltd., Tokyo (JP)

( * ) Notice: Subject to any disclaimer, the term of this patent is extended or adjusted under 35 U.S.C. 154(b) by 159 days.

(21) Appl. No.: 17/636,439

(22) PCT Filed: Jul. 8, 2020

(86) PCT No.: PCT/JP2020/026764
§ 371 (c)(1),
(2) Date: Feb. 18, 2022

(87) PCT Pub. No.: WO2021/039143
PCT Pub. Date: Mar. 4, 2021

(65) Prior Publication Data
US 2022/0270033 A1 Aug. 25, 2022

(30) Foreign Application Priority Data
Aug. 28, 2019 (JP) .................. 2019-156030

(51) Int. Cl.
*G06Q 10/087* (2023.01)
*G06Q 10/0631* (2023.01)
*G06Q 10/083* (2024.01)

(52) U.S. Cl.
CPC ....... *G06Q 10/087* (2013.01); *G06Q 10/0631* (2013.01); *G06Q 10/083* (2013.01)

(58) Field of Classification Search
CPC ............. G06Q 10/087; G06Q 10/0631; G06Q 10/083; G06Q 50/28; G06Q 10/06; G06Q 10/08; Y02P 90/02
See application file for complete search history.

(56) References Cited

U.S. PATENT DOCUMENTS 5,818,953 A * 10/1998 Queisser ............... G06T 7/90
356/406
6,249,715 B1 * 6/2001 Yuri ...................... G06Q 10/04
702/182

(Continued)

FOREIGN PATENT DOCUMENTS

CN 107516142 A * 12/2017
CN 108712988 A 10/2018

(Continued)

OTHER PUBLICATIONS

Baker, Peter, and Zaheed Halim. "An Exploration of Warehouse Automation Implementations: Cost, Service and Flexibility Issues." Supply Chain Management: An International Journal 12.2 (2007): 129-138. Web. (Year: 2007).*

(Continued)

*Primary Examiner* — Ashford S Hayles

(57) ABSTRACT

Provided is a work planning system including a processor and a storage unit connected to the processor. The storage unit stores a plurality of shipping orders, work network information pertaining to a process for work necessary for shipping, and resource information pertaining to a plurality of resources that can be used for work. The processor classifies work corresponding to the plurality of shipping orders into a plurality of tasks on the basis of a prescribed condition and the work network information, generates a process plan including allocation of the resources to the process for each of the tasks on the basis of the resource information, and outputs the generated process plan.

17 Claims, 7 Drawing Sheets

(56) References Cited

U.S. PATENT DOCUMENTS

| | | | | |
|---|---|---|---|---|
| 6,578,005 | B1* | 6/2003 | Lesaint | G06Q 10/06 705/7.14 |
| 7,295,990 | B1* | 11/2007 | Braumoeller | G06Q 10/063 705/28 |
| 7,356,376 | B1* | 4/2008 | Aboujaoude | G06Q 10/06 700/100 |
| 7,539,630 | B2* | 5/2009 | Crampton | G06Q 20/203 705/26.1 |
| 8,136,114 | B1* | 3/2012 | Gailloux | G06Q 10/06 718/104 |
| 8,352,382 | B1* | 1/2013 | Katta | G06Q 10/087 705/330 |
| 8,374,922 | B1* | 2/2013 | Antony | G06Q 30/00 705/28 |
| 8,560,461 | B1* | 10/2013 | Tian | G06Q 10/087 705/332 |
| 9,779,375 | B2* | 10/2017 | Grabovski | G06Q 10/06316 |
| 10,133,797 | B1* | 11/2018 | Mishra | G06F 16/254 |
| 10,565,543 | B1* | 2/2020 | Mo | G01C 21/343 |
| 10,699,223 | B1* | 6/2020 | Shah | G06Q 10/06311 |
| 10,803,413 | B1* | 10/2020 | Xu | G06Q 10/067 |
| 2002/0082951 | A1* | 6/2002 | Ashizaki | G06Q 30/00 705/26.5 |
| 2003/0154232 | A1* | 8/2003 | Beringer | G06Q 10/10 718/102 |
| 2003/0204431 | A1* | 10/2003 | Ingman | G06Q 10/063116 705/7.26 |
| 2004/0153379 | A1* | 8/2004 | Joyce | G06Q 10/08 705/28 |
| 2004/0167652 | A1* | 8/2004 | Ishii | G06Q 10/06316 705/7.26 |
| 2004/0254820 | A1* | 12/2004 | Ishii | G06Q 90/00 705/32 |
| 2005/0015167 | A1* | 1/2005 | Searcy | G06Q 10/1093 705/7.18 |
| 2005/0196070 | A1* | 9/2005 | Takakura | G06V 10/24 382/284 |
| 2005/0209902 | A1* | 9/2005 | Iwasaki | G06Q 10/06316 705/7.14 |
| 2005/0234758 | A1* | 10/2005 | Nishi | G06Q 10/06 705/80 |
| 2006/0068812 | A1* | 3/2006 | Carro | H04W 8/183 455/456.6 |
| 2006/0111955 | A1* | 5/2006 | Winter | H04W 4/029 705/7.19 |
| 2007/0219842 | A1* | 9/2007 | Bansal | G06Q 10/20 715/810 |
| 2008/0141254 | A1* | 6/2008 | Lee | G06Q 10/1095 718/102 |
| 2008/0201713 | A1* | 8/2008 | Chaffee | G06Q 10/06 718/103 |
| 2008/0300954 | A1* | 12/2008 | Cameron | G06Q 10/1097 705/7.21 |
| 2009/0007101 | A1* | 1/2009 | Azar | G06F 9/5077 718/1 |
| 2009/0063238 | A1* | 3/2009 | Storzum | G06Q 10/06398 705/7.42 |
| 2009/0150209 | A1* | 6/2009 | Levine | G06Q 10/06 705/7.13 |
| 2010/0262453 | A1* | 10/2010 | Robinson | G06Q 10/087 705/28 |
| 2011/0112885 | A1* | 5/2011 | Rijhsinghani | G06Q 10/06315 705/7.25 |
| 2012/0072431 | A1* | 3/2012 | Berlener | G06Q 30/06 707/E17.084 |
| 2012/0253869 | A1* | 10/2012 | Ansley | G06Q 10/06 705/7.12 |
| 2014/0136255 | A1* | 5/2014 | Grabovski | G06Q 10/063114 705/7.14 |
| 2014/0142998 | A1* | 5/2014 | Kroeger | G06Q 10/06311 705/7.13 |
| 2014/0195295 | A1* | 7/2014 | Whitley | G06Q 10/0633 705/7.27 |
| 2014/0278627 | A1* | 9/2014 | Grabovski | G06Q 10/06316 705/7.26 |
| 2014/0278638 | A1* | 9/2014 | Kreuzkamp | G06Q 10/06398 705/7.15 |
| 2015/0045943 | A1* | 2/2015 | Napoli | G06Q 20/10 700/214 |
| 2015/0127412 | A1* | 5/2015 | Kothandaraman | G06Q 30/0635 705/7.26 |
| 2015/0135186 | A1* | 5/2015 | Lin | G06F 9/505 718/104 |
| 2015/0199641 | A1* | 7/2015 | Napoli | G06Q 10/063114 705/7.15 |
| 2015/0294265 | A1* | 10/2015 | Monteverde | G06Q 10/1097 705/333 |
| 2015/0302330 | A1* | 10/2015 | Banner | G06Q 10/06 705/7.13 |
| 2015/0307278 | A1* | 10/2015 | Wickham | G06Q 10/087 700/216 |
| 2015/0317582 | A1* | 11/2015 | Nath | G06Q 10/06311 705/7.13 |
| 2016/0092805 | A1* | 3/2016 | Geisler | G06Q 10/08 705/7.27 |
| 2016/0162478 | A1* | 6/2016 | Blassin | G06Q 10/063112 706/12 |
| 2016/0189076 | A1* | 6/2016 | Mellott | G06Q 10/06312 705/7.14 |
| 2016/0266930 | A1* | 9/2016 | Jones | G06Q 10/06311 |
| 2016/0328781 | A1* | 11/2016 | Patel-Zellinger | G06Q 30/0635 |
| 2017/0278041 | A1* | 9/2017 | LaReau | G06Q 10/063114 |
| 2017/0308096 | A1* | 10/2017 | Nusser | B65G 57/03 |
| 2018/0025460 | A1* | 1/2018 | Watanabe | G06Q 10/087 705/28 |
| 2018/0075409 | A1* | 3/2018 | Kreger | G06Q 10/103 |
| 2018/0096286 | A1* | 4/2018 | Cook | G06Q 10/06316 |
| 2018/0108102 | A1* | 4/2018 | Kapuria | B65G 1/137 |
| 2018/0129992 | A1* | 5/2018 | Lord | G06Q 10/08 |
| 2018/0150699 | A1* | 5/2018 | Yasunaga | G06T 7/11 |
| 2018/0158016 | A1* | 6/2018 | Pandya | G05B 19/41895 |
| 2018/0197137 | A1* | 7/2018 | High | G06Q 30/0641 |
| 2018/0225620 | A1* | 8/2018 | Cantrell | G06Q 10/0633 |
| 2018/0225795 | A1* | 8/2018 | Napoli | G06Q 10/06316 |
| 2018/0240181 | A1* | 8/2018 | Lopez | G06Q 10/00 |
| 2018/0247369 | A1* | 8/2018 | Smith | G06Q 30/0635 |
| 2018/0260253 | A1* | 9/2018 | Nanda | G06F 11/3476 |
| 2018/0260878 | A1* | 9/2018 | Nanda | G06F 9/5038 |
| 2018/0260881 | A1* | 9/2018 | Ramirez | G06Q 10/0875 |
| 2018/0314999 | A1* | 11/2018 | Nemati | G06Q 10/087 |
| 2018/0322424 | A1* | 11/2018 | Wurman | G06Q 10/087 |
| 2019/0114583 | A1* | 4/2019 | Ripert | B65G 1/0492 |
| 2019/0130560 | A1* | 5/2019 | Horowitz | G06V 10/82 |
| 2019/0228375 | A1* | 7/2019 | Laury | G05D 1/0088 |
| 2019/0266555 | A1* | 8/2019 | Rajkhowa | G06Q 10/06312 |
| 2019/0318300 | A1* | 10/2019 | Cox | G06Q 10/063114 |
| 2019/0340561 | A1* | 11/2019 | Rajkhowa | G06Q 10/063114 |
| 2019/0370721 | A1* | 12/2019 | Issac | B07C 5/36 |
| 2019/0378066 | A1* | 12/2019 | Zhu | G06Q 10/0633 |
| 2020/0016754 | A1* | 1/2020 | Skubch | B25J 9/1682 |
| 2020/0175456 | A1* | 6/2020 | Dar Mousa | G06Q 10/04 |
| 2020/0223635 | A1* | 7/2020 | Govindaswamy | B65G 1/1375 |
| 2020/0302391 | A1* | 9/2020 | Li | G06Q 10/0875 |
| 2020/0349511 | A1* | 11/2020 | Seaver | G06Q 10/06312 |
| 2020/0364656 | A1* | 11/2020 | Liang | G06Q 10/06314 |
| 2021/0192659 | A1 | 6/2021 | Kondou et al. | |

FOREIGN PATENT DOCUMENTS

| | | | | |
|---|---|---|---|---|
| CN | 115193753 A | * | 10/2022 | B07C 5/3412 |
| JP | 2002-154615 A | | 5/2002 | |
| JP | 2002-308407 A | | 10/2002 | |
| JP | 2002-312445 A | | 10/2002 | |
| JP | 2008-158971 A | | 7/2008 | |
| JP | 2012086984 A | * | 5/2012 | |
| JP | 2013254429 A | * | 12/2013 | |

(56) References Cited

FOREIGN PATENT DOCUMENTS

| | | | | |
|---|---|---|---|---|
| JP | 2017-062656 A | | 3/2017 | |
| KR | 20160044280 A | | 4/2016 | |
| TW | 202113745 A | * | 4/2021 | ........... G06Q 10/047 |
| WO | WO-9825219 A1 | * | 6/1998 | ............ G06Q 10/06 |
| WO | WO-2014002319 A1 | * | 1/2014 | ............ G06Q 10/00 |
| WO | WO-2016170640 A1 | * | 10/2016 | ............ G06Q 10/06 |
| WO | 2017/094181 A1 | | 6/2017 | |

OTHER PUBLICATIONS

International Search Report, PCT/JP2020/026764, Oct. 13, 2020, 2 pgs.

Extended European Search Report issued on Jul. 26, 2023 for European Patent Application No. 20858387.2.

Extended European Search Report issued on May 28, 2024 for European Patent Application No. 24159500.8.

Baumann, H., "Order Picking Supported by Mobile Computing", Thesis, (2013).

Petersen, II, C. G., "An Evaluation of Order Picking Policies for Mail Order Companies", Article, Northern Illinois University, (2000).

Chinese Office Action issued on Apr. 7, 2025 for Chinese Patent Application No. 202080060797.8.

* cited by examiner

WORK PLANNING SYSTEM AND WORK PLANNING METHOD

CLAIM OF PRIORITY

The present application claims priority from Japanese patent application JP2019-156030 filed on Aug. 28, 2019, the content of which is hereby incorporated by reference into this application.

BACKGROUND

The present invention relates to a technique for planning work in a warehouse or the like.

An example of a conventional work planning system is the system disclosed in Patent Document 1 (Japanese Patent Application Laid-Open Publication No. 2002-154615). This system accumulates shipping orders in a database, divides the shipping orders by shipping work elements such as shipping item or package unit (e.g., a case or piece), performs quantization analysis of the time taken for work such as picking, conveyance, and secondary sorting, and determines bundling combinations to achieve the minimum shipping lead time, thereby determining bundles of shipping orders.

SUMMARY OF THE INVENTION

In the system disclosed in Patent Document 1, the sequence in which work is started for bundling the shipping orders is not considered, and a work manager determines the order. This presents the problem of a high likelihood of a lack of or excess resources (e.g., workers, devices, or equipment used for work, etc.) when a delay or front-loading of work occurs, and overall optimization including allocation of resources not being achieved.

In order to solve at least one of the foregoing problems, provided is a work planning system, comprising: a processor; and a storage unit connected to the processor, wherein the storage unit stores a plurality of shipping orders, work network information pertaining to a process for work necessary for shipping, and resource information pertaining to a plurality of resources that can be used for work, and wherein the processor classifies work corresponding to the plurality of shipping orders into a plurality of tasks on the basis of a prescribed condition and the work network information, generates a process plan including allocation of the resources to the process for each of the tasks on the basis of the resource information, and outputs the generated process plan.

According to one aspect of the present invention, work performed according to shipping orders can be optimized overall, including allocation of resources. Problems, configurations, and effects other than what was described above are made clear by the description of embodiments below.

DETAILED DESCRIPTION OF EMBODIMENTS

An embodiment of a work planning system according to the present invention will be described below with reference to drawings.

Figure 1:
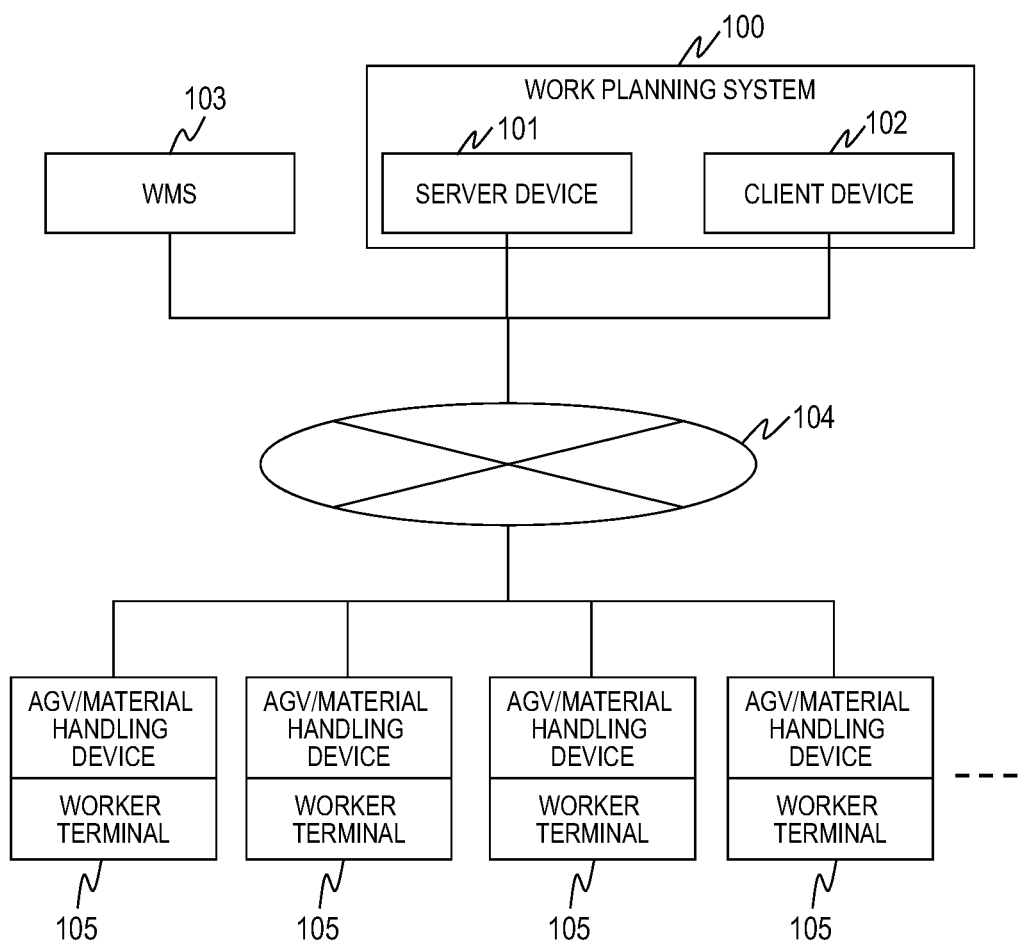
FIG. 1 is a block diagram showing a configuration of a work planning system according to an embodiment of the present invention.

FIG. 1 is a block diagram showing a configuration of a work planning system according to an embodiment of the present invention.

A work planning system 100 of the present embodiment is a system that plans work within a warehouse, and is constituted of a server device 101 and a client device 102. The server device 101 and the client device 102 are connected to a warehouse management system (WMS) 103 and a plurality of resource devices 105 via a network 104.

The warehouse management system 103 manages shipping orders from customers, manages inventory of goods in the warehouse, and the like. A similar warehouse management system to that used in typical warehouses may be used for the warehouse management system 103, and thus, detailed description thereof will be omitted. The work planning system 100 acquires shipping orders and the like from the warehouse management system 103, and transmits work instructions according thereto to each resource device 105. The configurations of the server device 101 and the client device 102 included in the work planning system 100 will be described later.

Each resource device 105 corresponds to a resource for executing work within the warehouse. If manual work is performed in the warehouse, for example, then the workers performing the work are the resources, and the resource device 105 corresponding thereto is a terminal device (worker terminal such as a handy terminal) used by the worker, for example.

Alternatively, if a material handling device or the like for performing work in the warehouse is used, then the material handling device is the resource and the same device also corresponds to the resource device 105. Examples of a material handling device include a conveyor for conveying goods, an automated guided vehicle (AGV) that conveys shelves storing goods, a picking robot that picks goods from the shelves, and the like.

Also, work locations (work stations) where work is performed, workbenches, and the like may be handled as resources, and in this case, if there are devices (e.g., terminals that display information to workers, etc.) corresponding to the work stations, the work benches, and the like, then the devices may be designated as the resource devices 105.

Any type of network may be used as the network 104 as long as the network enables communication between the work planning system 100 and the warehouse management system 103, communication between the work planning system 100 and each resource device 105, and communication between the server device 101 and the client device 102. Such communication may be performed by wired communication, wireless communication, or a combination thereof.

Figure 2:
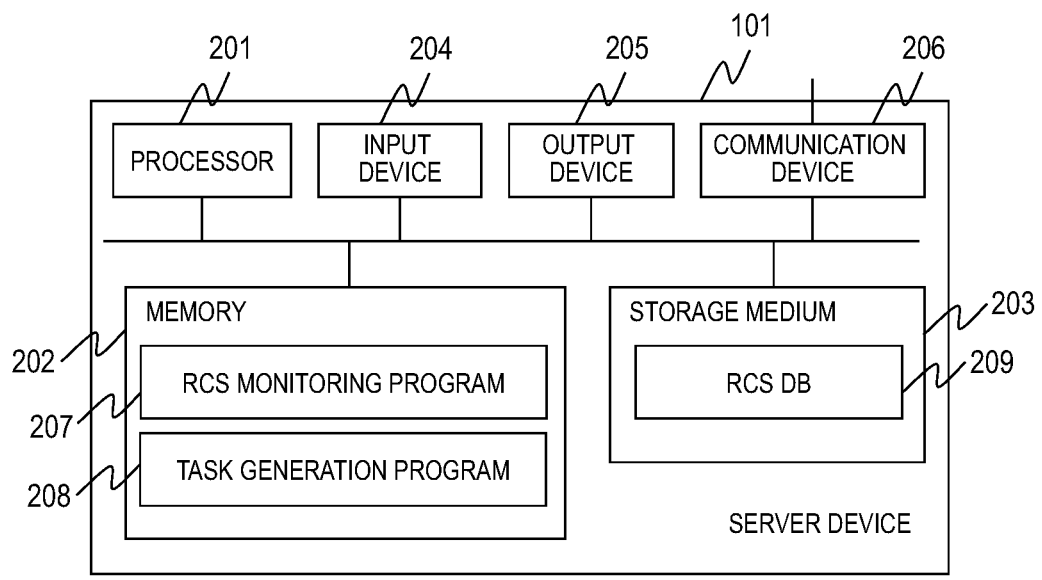
FIG. 2 is a block diagram showing a configuration of a server device according to an embodiment of the present invention.

FIG. 2 is a block diagram showing a configuration of the server device 101 according to an embodiment of the present invention.

The server device 101 of the present embodiment has a processor 201, a memory 202, a storage medium 203, an input device 204, an output device 205, and a communication device 206.

The processor 201 controls the server device 101 according to programs stored in the memory 202.

The memory 202 is a semiconductor memory, for example, and stores programs executed by the processor 201, data referred to by the processor 201, data acquired as a result of processes executed by the processor 201, and the like. At least a portion of the programs and data stored in the storage medium 203 may be copied to the memory 202 as necessary, and the acquired data may be copied from the memory 202 to the storage medium 203 as necessary.

In the example of FIG. 2, the memory 202 stores a resource control system (RCS) monitoring program 207 and a task generation program 208. These are, respectively, programs for monitoring resources and generating tasks, as will be described later. Processes executed according to these programs will be described later.

The storage medium 203 is a non-volatile storage medium such as a flash memory or a hard disk, for example. A resource control system database (RCS DB) 209 stored in the storage medium 203 will be described later.

The input device 204 receives input from an operator of the work planning system 100. Specifically, the input device 204 may include a keyboard, buttons, a pointing device, or the like, for example.

The output device 205 outputs information to the operator of the work planning system 100. Specifically, the output device 205 may include an image display device or the like, for example. At least a portion of the information generated as a result of processes performed according to the programs stored in the memory 202 may be outputted via the output device 205, for example.

The communication device 206 is a device that enables exchange of data between the warehouse management system 103, the client device 102, and the resource devices 105 via the wired or wireless network 104, and may include a LAN (local area network) adapter or the like, for example. At least a portion of the information stored in the storage medium 203 may be inputted via the communication device 206, and at least a portion of the information generated as a result of processes performed according to the programs stored in the memory 202 may be outputted via the communication device 206, for example.

Figure 3:
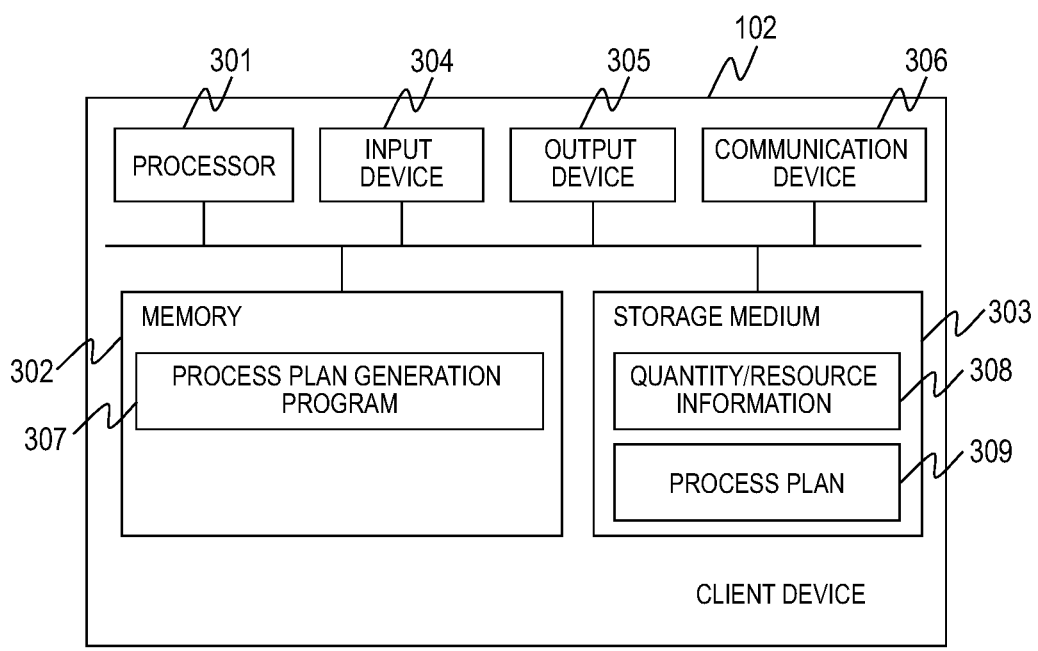
FIG. 3 is a block diagram showing a configuration of a client device according to an embodiment of the present invention.

FIG. 3 is a block diagram showing a configuration of the client device 102 according to an embodiment of the present invention.

The client device 102 of the present embodiment has a processor 301, a memory 302, a storage medium 303, an input device 304, an output device 305, and a communication device 306.

The processor 301 controls the client device 102 according to programs stored in the memory 302.

The memory 302 is a semiconductor memory, for example, and stores programs executed by the processor 301, data referred to by the processor 301, data acquired as a result of processes executed by the processor 301, and the like. At least a portion of the programs and data stored in the storage medium 303 may be copied to the memory 302 as necessary, and the acquired data may be copied from the memory 302 to the storage medium 303 as necessary.

In the example of FIG. 3, the memory 302 stores a process plan generation program 307. This is a program for generating process plans to be described later. Processes executed according to this program will be described later.

The storage medium 303 is a non-volatile storage medium such as a flash memory or a hard disk, for example. In the example of FIG. 3, the storage medium 303 stores quantity/resource information 308 and a process plan 309. The quantity/resource information 308 is data serving as a basis for the generation of process plans by the process plan generation program 307, and is information including the quantity of goods on which work is to be performed, the number of resources that can be used in the warehouse, and the productivity of each of the resources, for example. The process plan 309 is data generated by the process plan generation program 307. Content thereof will be described later.

The input device 304 receives input from an operator of the work planning system 100. Specifically, the input device 304 may include a keyboard, buttons, a pointing device, or the like, for example.

The output device 305 outputs information to the operator of the work planning system 100. Specifically, the output device 305 may include an image display device or the like, for example. At least a portion of the information generated as a result of processes performed according to the programs stored in the memory 302 may be outputted via the output device 305, for example.

The communication device 306 is a device that enables exchange of data between the server device 101 and the resource devices 105 via the wired or wireless network 140, and may include a LAN (local area network) adapter or the like, for example. At least a portion of the information stored in the storage medium 303 may be inputted via the communication device 306, and at least a portion of the information generated as a result of processes performed according to the programs stored in the memory 302 may be outputted via the communication device 306, for example.

In the example of FIGS. 1 to 3, the work planning system 100 is constituted of one server device 101 and one client device 102, but the work planning system 100 may be constituted of one server device 101 and a plurality of client devices 102, or may be constituted of one computer system that integrates the server device 101 and the client device 102, for example. The warehouse management system 103 can also be realized by a similar computer system to FIG. 2 or 3.

Figure 4:
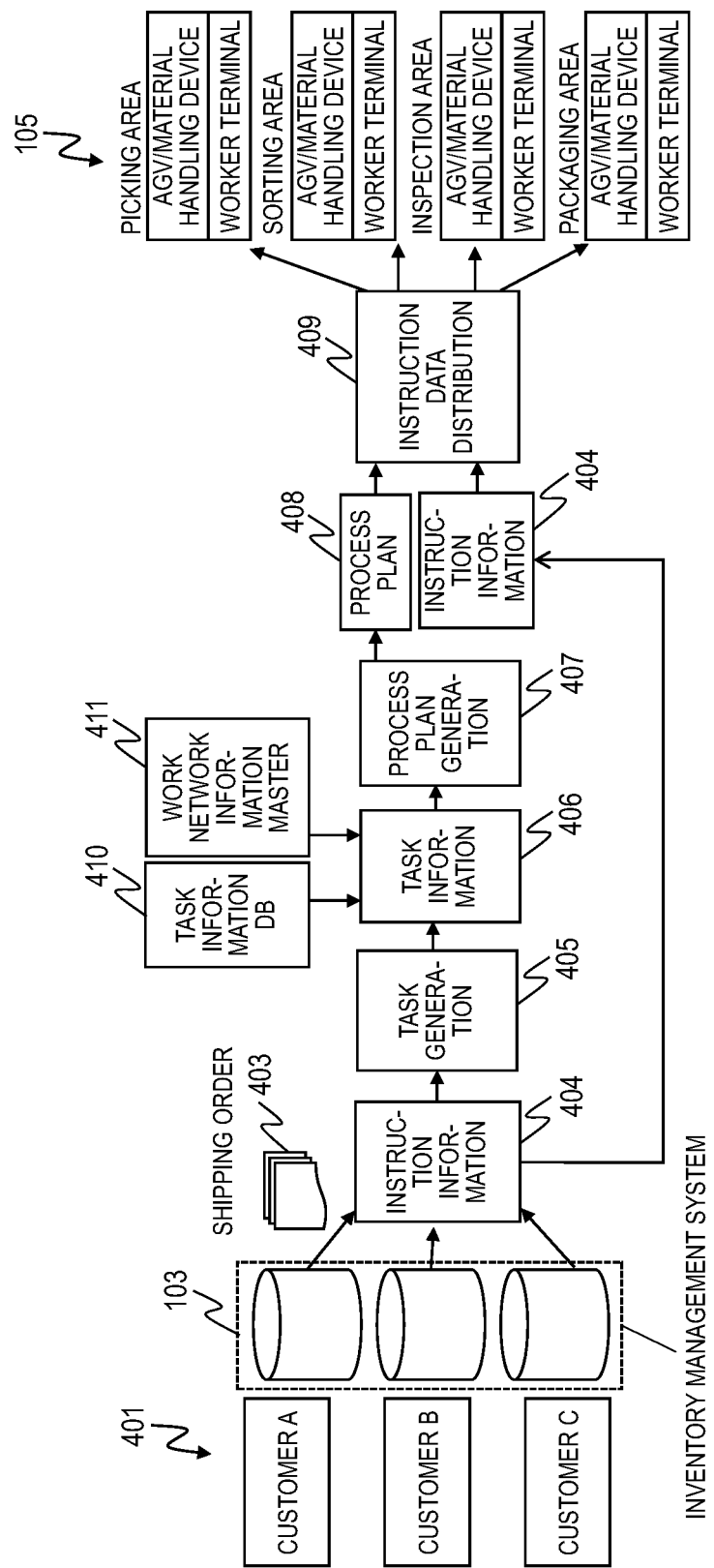
FIG. 4 is a descriptive drawing that summarizes processes executed by the work planning system according to an embodiment of the present invention.

FIG. 4 is a descriptive drawing that summarizes processes executed by the work planning system 100 according to an embodiment of the present invention.

A plurality of shipping orders 403 from a plurality of customers 401 are inputted to the work planning system 100 via an inventory management system or a sale management system of the WMS 103. Here, one shipping order 403 is a collection of orders for one or more product items shipped at the same timing to one shipping destination. The work planning system 100 generates instruction information 404 that includes work instructions for shipping products according to the shipping order 403. The method by which instruction information is generated from the shipping order 403 can be a conventional and known method, and thus, detailed explanation thereof is omitted here.

The work planning system 100 performs task generation 405 on the basis of the instruction information 404. As a result, task information 406 is generated. At this time, reference is made to a task information database 410 and a work network information master 411. The task information database 410 and the work network information master 411 may be included in the resource control system database 209 of the server device 101, for example.

The task generation 405 and the generated task information 406 will be described later. Here, an example in which the plurality of shipping orders 403 are classified into a plurality of tasks will be described. As a result of this process, the instruction information 404 corresponding to each shipping order 403 is classified into tasks corresponding to each shipping order 403. The generated task information 406 is stored in the task information database 410.

Then, the work planning system 100 performs process plan generation 407 on the basis of the task information 406. As a result, a process plan 408 is generated. The process plan generation 407 and the generated process plan 408 will be described later.

The work planning system 100 performs instruction data distribution 409 on the basis of the process plan 408 and the instruction information 404. Specifically, the work instructions included in the instruction information 404 are distributed to the resource device 105 corresponding to the work according to the generated process plan 408 at a suitable timing (e.g., a timing at which work is performed according to the process plan 408).

Figure 5:
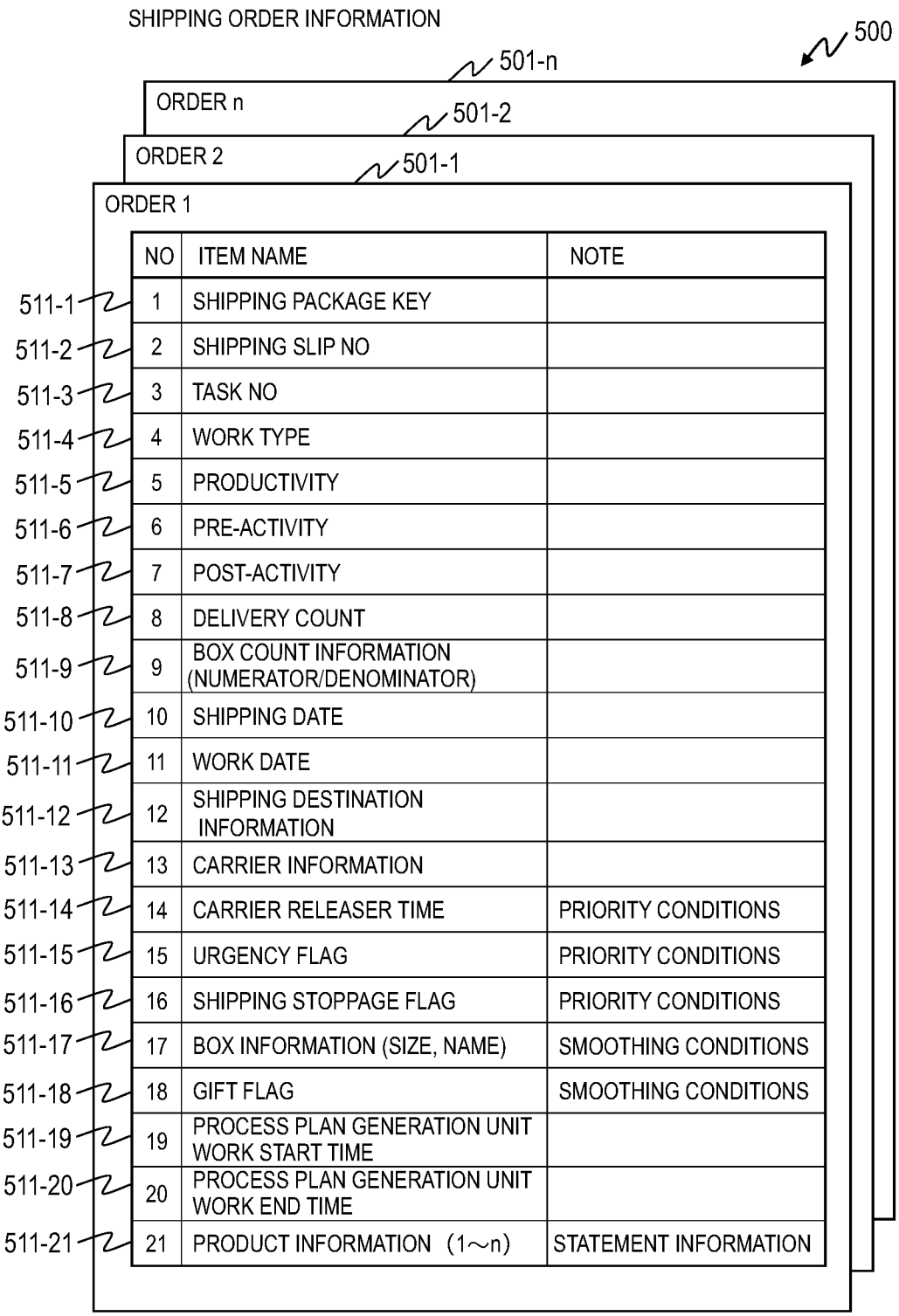
FIG. 5 is a descriptive drawing of shipping order information stored by the work planning system according to an embodiment of the present invention.

FIG. 5 is a descriptive drawing of shipping order information stored by the work planning system 100 according to an embodiment of the present invention.

The work planning system 100 may generate shipping order information 500 in which necessary items are added to the shipping order 403 from the customer 401, and store the shipping order information 500 in the task information DB 410. The shipping order information 500 shown in FIG. 5 includes a plurality of shipping orders 501 (e.g., a shipping order 1_501-1, a shipping order 2_501-2 . . . a shipping order n_501-n). For explanations that apply to all of the shipping orders, these are simply referred to as the shipping orders 501, collectively.

Typically, a plurality of shipping orders 501 corresponding to one shipping order 403 are generated. If products to be shipped according to one shipping order 403 are packaged by being divided into a plurality of shipping boxes, a shipping order 501 is generated for each shipping box. Also, if work is performed for a plurality of processes (e.g., picking, inspection, packaging, etc.) up to shipping of products according to one shipping order 403, then a shipping order 501 is generated for each process.

In the example of FIG. 5, each shipping order 501 includes, as items, a shipping package key 511-1, a shipping slip number 511-2, a task number 511-3, a work type 511-4, a productivity 511-5, a pre-activity 511-6, a post-activity 511-7, a delivery count 511-8, box count information 511-9, a shipping date 511-10, a work date 511-11, shipping destination information 511-12, carrier information 511-13, a carrier release time 511-14, an urgency flag 511-15, a shipping stoppage flag 511-16, box information 511-17, a gift flag 511-18, a process plan generation unit work start time 511-19, a process plan generation unit work end time 511-20, and product information 511-21.

The shipping package key 511-1 is key information assigned to each shipping box that packages a product shipped according to the shipping order 501. A sticker on which a barcode indicating a value (number) of the shipping package key 511-1 is printed may be attached to the shipping box to identify the shipping box, for example.

The shipping slip number 511-2 is a number that identifies the shipping order 403 corresponding to the shipping order 501. Since the order is the same as the shipping (delivery) unit (i.e., products shipped according to one shipping order 403 are shipped to the same shipping destination at the same timing), the shipping slip number 511-2 may be used as a delivery slip number.

If products shipped according to one shipping order 403 are packaged into a plurality of shipping boxes, a shipping order 501 is generated for each shipping box, the shipping package keys 511-1 of the respective shipping orders 501 differ from each other, and the same shipping slip number 511-2 is used.

The task number 511-3 is a unique number for each task that is assigned as a result of the task generation 405. As will be described later, tasks are generated by classifying the plurality of shipping orders 501 on the basis of priority conditions, smoothing conditions, and the like.

The work type 511-4 indicates the type of work (e.g., the process) corresponding to the shipping order 501. If it is necessary to perform work for each process including picking, inspection, and packaging in order to ship a product according to a given shipping order 403, for example, then three shipping orders 501 corresponding to the shipping order 403 are generated, and values indicating picking, inspection, and packaging are recorded as the respective work types 511-4. In the present embodiment, the work type is defined as being the same as the process and the activity to be described later.

The productivity 511-5 indicates the processing capability for the quantity per unit time for each process. The quantity may be any one of the piece count, the box count, the slip count, or the like, but in the present embodiment, the unit for the quantity is the box. The actual productivity can vary according to various conditions such as the product type. In the case of a process in which work is manually performed, for example, the productivity can also vary according to the level of skill, fatigue, and the like of the worker. Productivity may be defined in such precise terms, but the productivity 511-5 of the present embodiment is the average productivity applied uniformly for each process. The productivity may be calculated according to past performance, for example.

The pre-activity 511-6 indicates a process executed prior to a process corresponding to the shipping order 501 (i.e., a process indicated by the work type 511-4 of the shipping order 501). Also, the post-activity 511-7 indicates a process executed subsequent to the process corresponding to the shipping order 501. If, for example, work needs to be performed in the order of picking, inspection, and packaging, the work type 511-4 of the shipping order 501 corresponding to inspection is designated as "inspection," the pre-activity 511-6 is designated as "picking," and the post-activity 511-7 is designated as "packaging."

Information indicating the order of such process work is included in the work network information master 411. The work planning system 100 refers to the work network information master 411 to generate a shipping order 501 corresponding to a necessary process, and records the values of the pre-activity 511-6 and the post-activity 511-7.

The delivery count 511-8 is the total quantity of the product information 511-21 to be described later.

The box count information 511-9 is information pertaining to the boxes in which the products to be shipped are packaged according to the shipping order 403. If, for example, all products shipped according to one shipping order 403 are collectively packaged in one shipping box, then the value of the box count information 511-9 of the shipping order 501 corresponding to the shipping box is "1/1." If products shipped according to one shipping order 403 are divided into two shipping boxes, then the values of the box count information 511-9 of the shipping orders 501 corresponding to the shipping boxes are "1/2" and "2/2."

The shipping date 511-10 indicates the date at which the products included in the shipping order 501 are shipped.

The work date 511-11 is the date at which work for shipping the products included in the shipping order 501 is performed, and is the shipping date or a day prior thereto.

The shipping destination information 511-12 indicates the destination (delivery destination) at which the products are to be delivered according to the shipping order 501.

The carrier information 511-13 indicates the carrier that handles transportation of the products.

The carrier release time 511-14 is the time at which the carrier picks up the products. That is, the carrier release time 511-14 may be thought of as the planned shipping time for products from the warehouse.

The urgency flag 511-15 is a flag indicating that the products in the shipping order should be shipped faster than other shipping orders 501.

The shipping stoppage flag 511-16 is a flag indicating that, even though work instructions were issued in the warehouse, shipping has been canceled.

The box information 511-17 is information indicating the size of the shipping box. Specifically, the box information 511-17 may be information indicating the size of the shipping box (vertical, horizontal, and height dimensions) or may be a term or symbol indicating the size such as "large," "medium," or "small," for example.

The gift flag 511-18 is information indicating instructions for special work such as gift wrapping including the attachment of a ribbon or packaging of a cosmetics case, for example.

The process plan generation unit work start time 511-19 and the process plan generation unit work end time 511-20 respectively indicate the start time and the end time for process work corresponding to the shipping order 501 calculated through process plan generation 407.

The product information 511-21 is information pertaining to products included in the shipping order 501 (i.e., products to be packaged and shipped in the shipping box corresponding to the shipping order 501, among the products shipped according to the shipping order 403). If a plurality of product items (e.g., n items) are packaged in one shipping box, then the product information 511-21 includes information pertaining to the plurality of product items (e.g., first to nth items). Specifically, the product information 511-21 includes a product code identifying the product item, the product name indicating the name of the product, and the quantity. As previously described, the total quantity of all items included in one shipping order 501 is recorded as the delivery count 511-8.

The shipping order 501 shown in FIG. 5 includes information indicating that the carrier release time 511-14, the urgency flag 511-15, and the shipping stoppage flag 511-16 are priority conditions; and information indicating that the box information 511-17 and the gift flag 511-18 are smoothing conditions. These pieces of information are referred to in the task generation 405 to be described later. The product information 511-21 is also referred to in the task generation 405 as described later.

Figure 6:
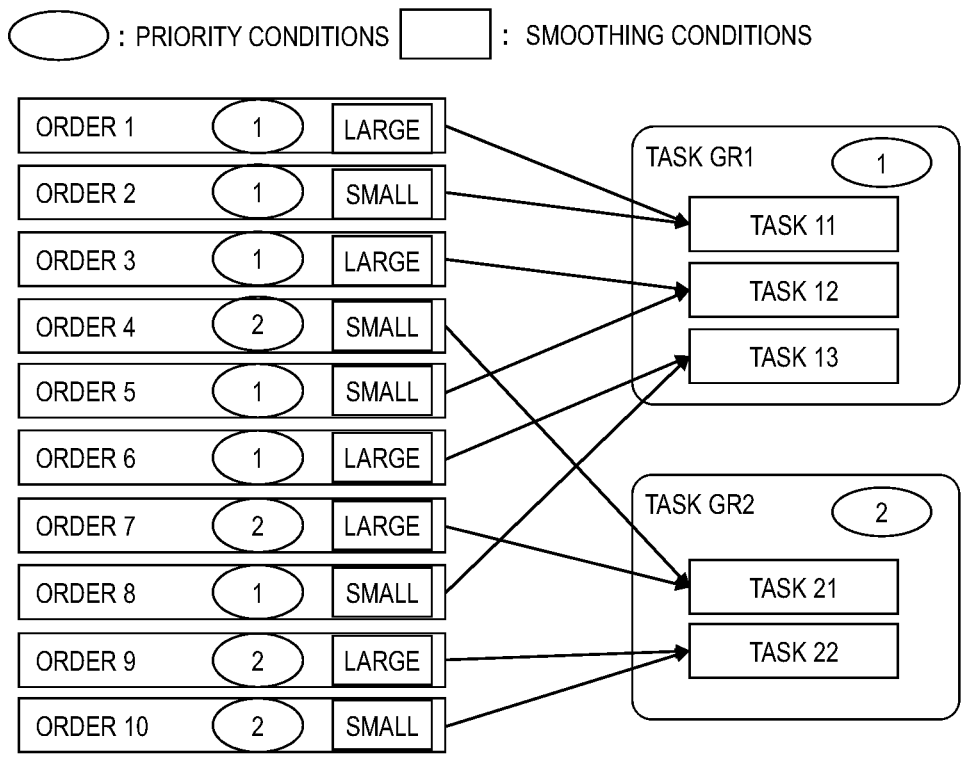
FIG. 6 is a descriptive drawing of task generation by the work planning system according to an embodiment of the present invention.

FIG. 6 is a descriptive drawing of the task generation 405 by the work planning system 100 according to an embodiment of the present invention.

A task in the present embodiment is a collection of a plurality of shipping orders 501. The resources of the warehouse are allocated for each task. The task generation 405 is a process for classifying the plurality of shipping orders 501 into a plurality of tasks. At this time, a plurality of shipping orders 501 corresponding to the same shipping box (e.g., the three shipping orders 501 corresponding, respectively, to picking, inspection, and packaging of the products to be shipped in a given shipping box) are necessarily classified into the same task.

Also, in the present embodiment, a task group may be set. A task group is a collection of one or more tasks constituted of shipping orders 501 for which the same priority conditions are set.

The work planning system 100 classifies, into tasks, the plurality of shipping orders 501 to be processed (e.g., the shipping orders 501 generated from the shipping orders 403 accumulated over a given period) on the basis of the priority conditions and smoothing conditions designated thereto (see FIG. 5 for both)

Specifically, the work planning system 100 classifies shipping orders 501 having the same values for the priority conditions into the same task group. The priority conditions are conditions pertaining to the degree of priority of process work corresponding to the shipping orders 501. For example, the earlier the carrier release time 511-14 is, the earlier the work for the shipping order 501 needs to be performed. Also, shipping orders 501 for which the urgency flag 511-15 indicates that the shipping order is urgent need to be prioritized over work for other shipping orders 501. Additionally, it is preferable that work be postponed for shipping orders 501 for which the shipping stoppage flag 511-16 indicates that shipping should be stopped, with work for other shipping orders 501 being prioritized.

Also, the work planning system 100 classifies the shipping orders 501 classified into the respective task groups into a plurality of tasks within each task group. At this time, the work planning system 100 performs classification such that the shipping orders 501 for which the same smoothing conditions are set are evenly distributed among the plurality of tasks within the task group.

Among the attributes of the shipping order 501, the smoothing conditions are attributes to be distributed among the tasks, or in other words, attributes that are believed to improve overall work efficiency by being smoothed (leveled) among tasks. In the example of FIG. 5, the box information 511-17 and the gift flag 511-18 correspond to smoothing conditions.

In a case where one each of an automatic sealing machine for large shipping boxes and an automatic sealing machine for small shipping boxes are disposed in work locations allocated to respective tasks, if shipping orders 501 for large shipping boxes are concentrated to one task and shipping orders 501 for small shipping boxes are concentrated to another task, this can result in work being backed up at the automatic sealing devices in the respective work locations, resulting in decreased productivity overall. This similarly applies to gift wrapping. Thus, by uniformly distributing, across a plurality of tasks, the shipping orders 501 for which the same smoothing conditions are set, it is possible to anticipate an improvement in overall work efficiency.

If classifying the shipping orders 501 where the size of the shipping box is "large" to a given task, for example, a configuration may be adopted in which the proportion of shipping orders 501 with "large" shipping boxes in relation to all relevant shipping orders 501 is compared to the proportion of shipping orders 501 with "large" shipping boxes in relation to the shipping orders 501 that are already classified to the tasks, and tasks where the latter proportion is smaller are selected as the classification destination. As a result, if the proportions of shipping orders 501 where the sizes of the shipping boxes are "large," "medium," and "small" included in each task are calculated, the shipping orders 501 having the attributes (e.g., the shipping box sizes being "large," "medium," "small") are distributed among tasks such that the proportions are even among the tasks. Work for gift wrapping can also be distributed by a similar method.

In the example of FIG. 6, the carrier release time 511-14 (that is, the shipping time) is referred to as the priority condition and the box information 511-17 is referred to as the smoothing condition. In this example, shipping orders 1, 2, 3, 5, 6, and 8 where the shipping time is 17:00 are classified into a task group (Gr)1. Shipping orders 4, 7, 9, and 10 where the shipping time is 18:00 are classified into a task group 2. That is, work corresponding to shipping orders having differing priority conditions set thereto are not classified to the same task.

Among the shipping orders classified to the task group 1, the shipping orders 1, 3, and 6 corresponding to the large shipping boxes are distributed among the tasks 11, 12, and 13 in the task group 1. Meanwhile, among the shipping orders classified to the task group 1, the shipping orders 2, 5, and 8 corresponding to the small shipping boxes are similarly distributed among the tasks 11, 12, and 13 in the task group 1.

Among the shipping orders classified to the task group 2, the shipping orders 7 and 9 corresponding to the large shipping boxes are distributed among the tasks 21 and 22 in the task group 2. Meanwhile, among the shipping orders classified to the task group 2, the shipping orders 4 and 10 corresponding to the small shipping boxes are distributed among the tasks 21 and 22 in the task group 2.

As a result, all of the tasks include one each of a shipping order of large shipping boxes and a shipping order of small shipping boxes, and a reduction in work efficiency due to the concentration of load on a specific resource or the like is prevented. Also, by consolidating shipping orders with the same priority conditions to the same task group, it is possible to generate a process plan in which shipping boxes are completed at a suitable timing.

Additionally, the work planning system 100 may refer to the product information 511-21 of the shipping order 501 to classify the shipping order 501 to a task so as to increase the bias of the product items included in the task. If, for example, a given shipping order 501 is to be classified to one of the plurality of tasks, then a configuration may be adopted in which, if each task already has one or more shipping orders 501 classified thereto, the degree of overlap in products of the same item is calculated between the shipping boxes of the shipping order 501 to be classified and the shipping boxes of the shipping orders 501 that are already classified to the respective tasks, and the shipping order 501 to be classified is classified to the task with the highest degree of overlap.

In this case, the degree of overlap may be calculated as (number of products of overlapping item)/(number of products of shipping box to be classified+number of products already classified to task+1).

As previously described, resources such as workers, devices used for work, and work location are allocated for each task, and thus, if there is a bias in the product items included in the tasks, an improvement in overall work efficiency due to a reduction in the number of instances that product shelves are transported for picking can be anticipated, for example.

Figure 7:
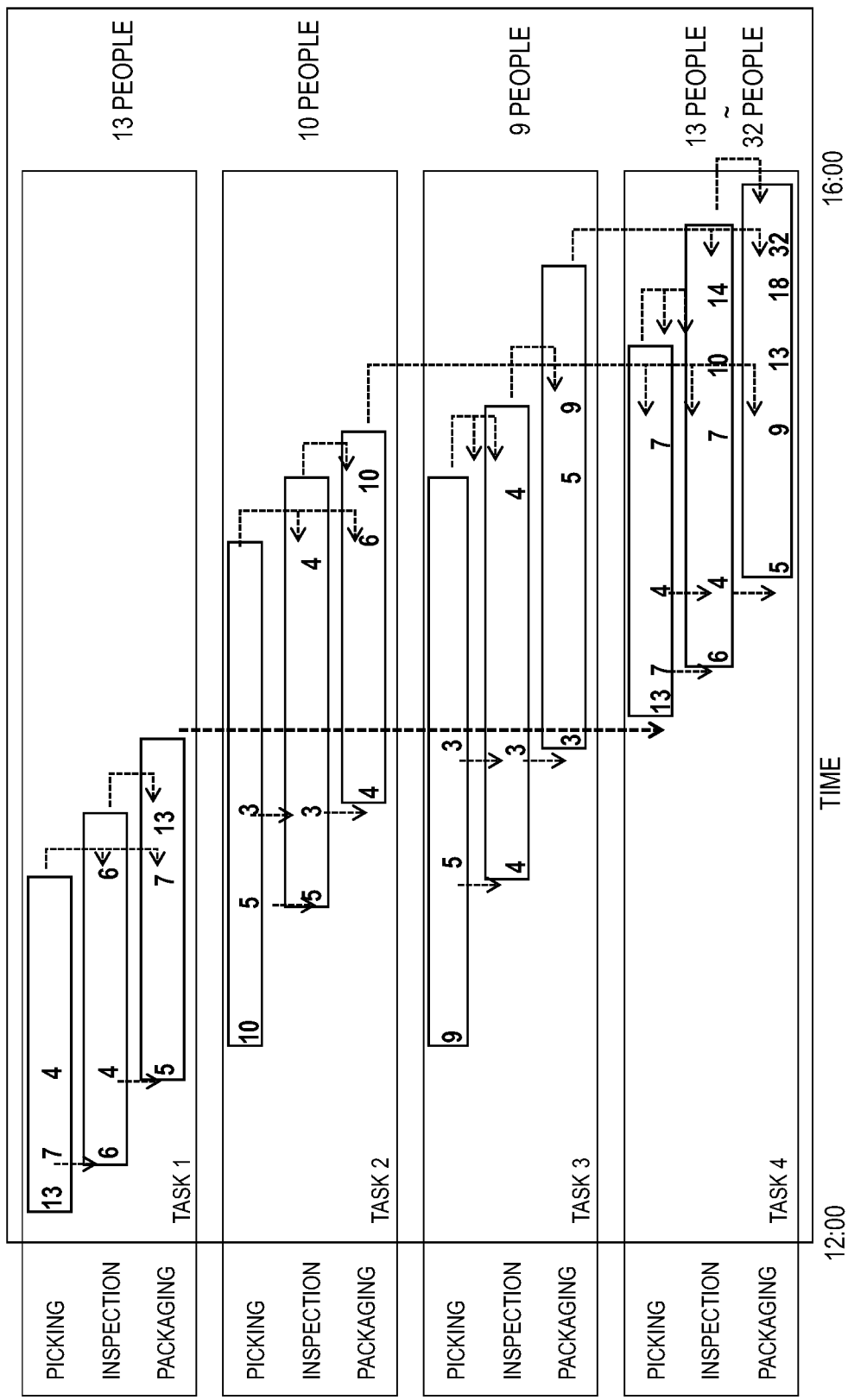
FIG. 7 is a descriptive drawing of a process plan generated by the work planning system according to an embodiment of the present invention.

FIG. 7 is a descriptive drawing of a process plan generated by the work planning system 100 according to an embodiment of the present invention.

In the process plan generation 407 of FIG. 4, the work planning system 100 generates a process plan for each task. Specifically, the time required for each process can be calculated on the basis of the productivity 511-5 of the shipping order 501 included in each task, the quantity identified from the product information 511-21, and the amount of resources allocated to each task.

The work planning system 100 creates process plans such that the process work for all tasks within a task group ends by the shipping time of the task group. At this time, the work planning system 100 creates the process plan such that each process is started in the sequence defined by the work network information master 411, and so as to end after the required time calculated by the above-mentioned method has elapsed. Thus, there is no limit on the specific method, but calculation of the required time may be repeated while changing the allocated resource amount each time until a process plan in which all process work ends by the shipping time is attained, for example.

FIG. 7 shows an example of process plans of four tasks including tasks 1 to 4 belonging to the same task group indicated in a bar chart. In this example, the release time is 16:00. The numbers written on the bars indicate the number of workers (i.e., the amount of resources) allocated to each process plan. In each task, picking, inspection, and packaging are sequentially performed.

In this example, picking for task 1 is started at 12:00. The number of workers allocated at this stage is 13. Then, after picking has progressed to a certain degree, six of the 13 workers start inspection of products that have been picked. At this stage, the number of workers performing picking is reduced to seven. Further thereafter, after inspection has progressed to a certain degree, three of the seven workers performing picking and two of the six workers performing inspection start packaging products that have been inspected. Then, after all products have been picked, two of the four workers who were performing picking are transitioned to inspection and the remaining two workers are transitioned to packaging. After inspection of all products is complete, all six workers who were performing inspection are transitioned to packaging. Once packaging of all products has been completed, all work of task 1 is complete.

In this example, 13 workers are assigned to task 1 from beginning to end. Thus, it is also possible to create a plan in which 13 workers perform picking, and once all products have been picked, the 13 workers start inspection, for example. However, in this case, a large amount of space is required to temporarily place products that have been picked but not yet inspected. Thus, by transitioning some of the resources after the previous step (e.g., picking) has progressed to a certain degree to start the next step (e.g., inspection) as described above, it is possible for the work to progress while saving on space for temporary placement of products. Parameters indicating to what degree the previous step should have progressed in order to start the next step may be included in advance in the quantity/resource information 308 or the like, or may be provided when creating the process plan, for example.

In the example of FIG. 7, the process work for tasks 2 and 3 is started after the process work for task 1 has started.

Similar to task 1, this process work is also planned such that after the previous step has progressed to a certain degree, the next step is started.

Additionally, in the example of FIG. 7, when all process work of task 1 is ended, the workers assigned to task 1 start the process work of task 4. Similar to task 1, the process work of task 4 is also planned such that after the previous step has progressed to a certain degree, the next step is started. Also, the plan is designed such that when all process work of tasks 2 and 3 is complete, the workers who were assigned to tasks 2 and 3 are transitioned to task 4 and perform the process work of task 4.

In the example of FIG. 7, the process work of tasks 2 and 3 is started at a delay from task 1. As a result, the working hours of the workers assigned to tasks 2 and 3 are reduced, thereby reducing cost. The work planning system 100 may generate a process plan so as to minimize the overall cost with reference to unit cost information of the resources (e.g., the hourly wages of the workers, etc.). The unit cost information of the resource may be included in the quantity/resource information 308.

The work planning system 100 records the start time and the end time (each being the starting time and ending time of the bar of each process in FIG. 7) of each process of each task in the generated process plan, in the process plan generation unit work start time 511-19 and the process plan generation unit work end time 511-20 of the corresponding shipping order 501, respectively.

Figure 8:
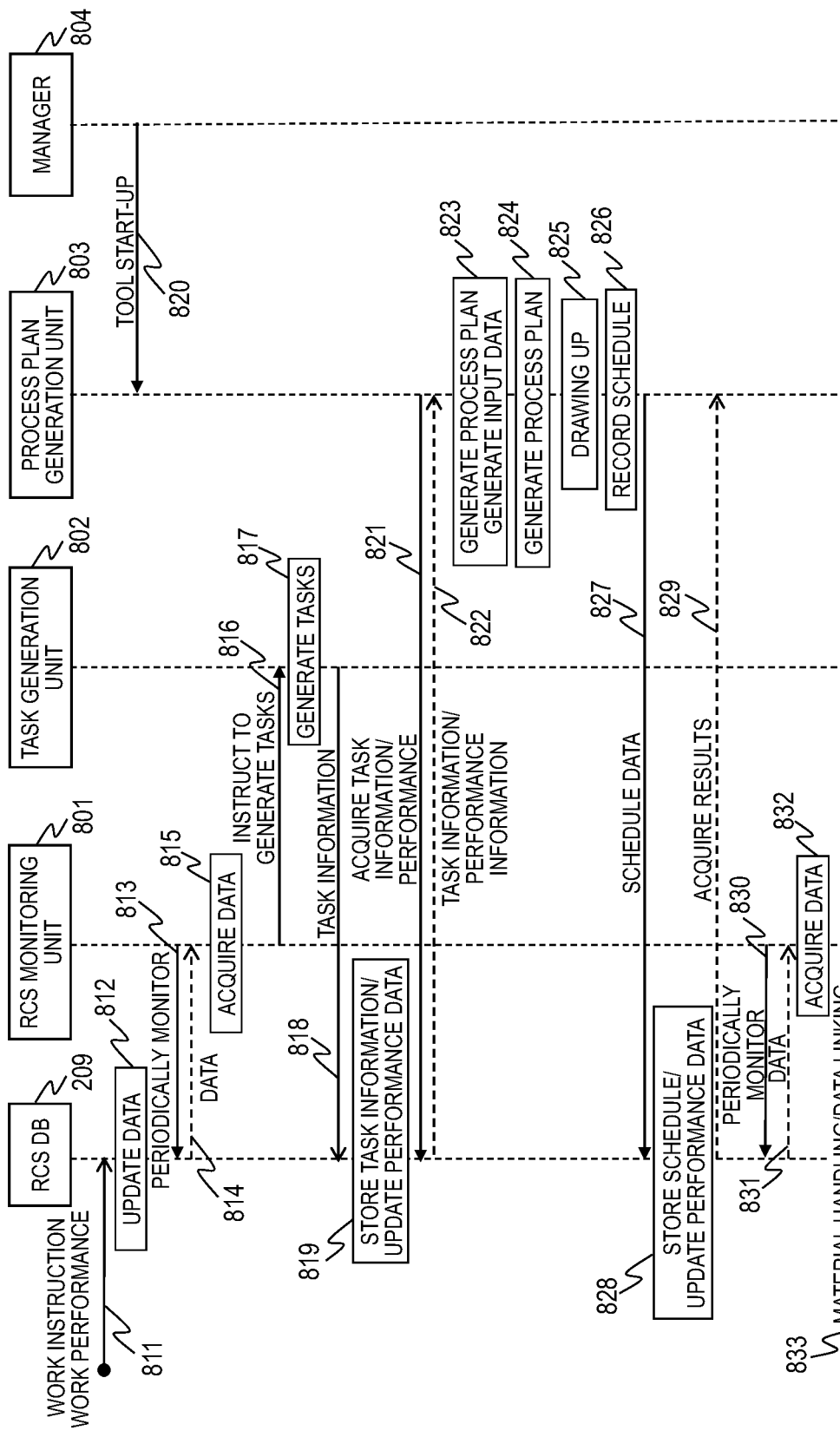
FIG. 8 is a sequence drawing that shows details of processes executed by the work planning system according to an embodiment of the present invention.

FIG. 8 is a sequence drawing that shows details of processes executed by the work planning system 100 according to an embodiment of the present invention.

A resource control system (RCS) monitoring unit 801 and a task generation unit 802 shown in FIG. 8 are respectively functional blocks realized by the processor 201 of the server device 101 executing the resource control system monitoring program 207 and the task generation program 208 in the memory 202. Thus, the processes executed by each unit in the description below are in reality executed by the processor 201 on the basis of the programs in the memory 202.

Similarly, the process plan generation unit 803 is a functional block realized by the processor 301 of the client device 102 executing the process plan generation program 307 in the memory 302. Thus, the processes executed by the process plan generation unit 803 in the description below are in reality executed by the processor 301 on the basis of the programs in the memory 302.

The resource control system database 209, upon receiving input of a work instruction and/or a work performance (step 811), updates stored data on the basis thereof (step 812). If, for example, the server device 101 receives input of the shipping orders 403 from the warehouse management system 103, the shipping orders 403 are added to the resource control system database 209. Also, if information that, for example, indicates which process work of which task has been completed is inputted to the server device 101 as work performance from the warehouse management system 103, then the performance data in the resource control system database 209 is updated on the basis thereof. As a result, it is possible to determine which work corresponding to the shipping orders 403 received up to the present time has yet to be performed.

The resource control system monitoring unit 801 periodically monitors the resource control system database 209 (step 813) and acquires data (steps 814, 815). The resource control system monitoring unit 801 instructs the task generation unit 802 to generate tasks (step 816). The resource control system monitoring unit 801 may, for example, issue an instruction to generate a task for work that has yet to be classified into any task among work corresponding to the shipping orders 403 that have been received up to the present time, or may issue an instruction to generate a task for work that has yet to be executed.

The task generation unit 802 executes task generation according to instructions (step 817) and stores the generated task information in the resource control system database 209 (steps 818, 819). Also, if new work performance has been obtained by the present time, then the performance data in the resource control system database 209 is accordingly updated (step 819).

This process of task generation corresponds to the task generation 405 of FIG. 4. At this time, task generation unit 802 may generate a new task for shipping orders 403 to be subject to task generation, or may classify the shipping orders 403 into an already generated task. If, for example, the task generation unit 802, after performing task generation once, performs new task generation for newly acquired shipping orders 403, work corresponding to the newly acquired shipping orders 403 may be classified into newly generated tasks or may be classified into already generated tasks. Through this task generation, at least the task number 511-3 of FIG. 5 is determined, and the value thereof is recorded in the shipping order 511 in the resource control system database 209.

Meanwhile, a manager 804 of the warehouse work starts up the process plan generation unit 803 of the client device 102 (step 820). The process plan generation unit 803 acquires the task information and performance information from the resource control system database 209 (steps 821, 822), generates process plan generation input data from the acquired information (step 823), and generates a process plan (step 824).

At this time, the process plan generation unit 803 may generate a process plan for tasks for which no process plan has been generated yet, on the basis of the information acquired from the resource control system database 209. Alternatively, the process plan generation unit 803 may generate a process plan not only for tasks for which a process plan has not yet been generated, but also for tasks for which a process plan has been created but not yet been executed, with reference to the performance information. In the case of the latter, even if there is a gap between the generated process plan and actual progress, by generating a process plan considered to be optimal at that time for all remaining work, it is possible to absorb the gap and improve the overall work efficiency.

Also, the process plan generation unit 803 may monitor the gap between the generated process plan and the actual progress and, if the gap satisfies a prescribed condition such as the size of the gap exceeding a prescribed criterion, for example, generate a process plan for tasks for which a process plan was created but not yet executed.

The process of step 824 is as described regarding the process plan generation 407 of FIG. 4. Then, the process plan generation unit 803 draws up the generated process plan (step 825). For example, the process plan generation unit 803 may draw a bar chart such as that shown in FIG. 7 and output the bar chart from the output device 305 of the client device 102. The manager 804 can determine whether the generated process plan is suitable with reference to this bar chart and, as necessary, modify the process plan or change conditions and issue an instruction for re-execution.

Then, the process plan generation unit 803 records a schedule according to the generated process plan (step 826). Thus, schedule data is transmitted to the resource control system database 209 and stored therein (steps 827, 828). As a result, values that conform to the generated process plan are recorded in the process plan generation unit work start time 511-19 and the process plan generation unit work end time 511-20 (FIG. 5) of the task to be subject to process plan generation. Also, if new work performance has been obtained by the present time, then the performance data in the resource control system database 209 is accordingly updated (step 828).

Then, the process plan generation unit 803 can acquire the recorded results of the generated process plan from the resource control system database 209 as necessary (step 829).

The resource control system monitoring unit 801 then periodically monitors the resource control system database 209 (step 830) and acquires data (steps 831, 832). Then, the resource control system monitoring unit 801 transmits, at a suitable timing determined on the basis of the generated process plan, instruction data for issuing instructions for work to each resource device 105 (step 833).

Specifically, if the resource is a worker, then the resource control system monitoring unit 801 may transmit, as instruction data, data for displaying text drawings or the like that contain work content, for example. Also, if the resource is a device such as a picking robot, then the data for controlling the device may be generated and transmitted as instruction data.

As a result, each resource is controlled at a suitable timing, and work within the warehouse is optimized.

The present invention is not limited to the embodiment above, and includes various modification examples. The embodiment above was described in detail in order to explain the present invention in an easy to understand manner, but the present invention is not necessarily limited to including all configurations described, for example. It is possible to replace a portion of the configuration of one embodiment with a configuration of another embodiment, and it is possible to add to the configuration of the one embodiment a configuration of another embodiment. Furthermore, other configurations can be added or removed, or replace portions of the configurations of the respective embodiments.

Some or all of the respective configurations, functions, processing units, processing means, and the like can be realized with hardware such as by designing an integrated circuit, for example. Additionally, the respective configurations, functions, and the like can be realized by software, by the processor interpreting programs that realize the respective functions and executing such programs. Programs, data, tables, files, and the like realizing respective functions can be stored in a storage device such as a non-volatile semiconductor memory, a hard disk drive, or a solid state drive (SSD), or in a computer-readable non-transitory data storage medium such as an IC card, an SD card, or a DVD.

Control lines and data lines regarded as necessary for explanation have been indicated, but not all control lines and data lines in the product have necessarily been indicated. In reality, almost all components can be thought of as connected to each other.

What is claimed is:

1. A work planning system that improves utilization of a plurality of heterogenous resources in a shipping system, comprising:
   a memory that stores work network information pertaining to a process for work necessary for shipping, and resource information pertaining to the plurality of heterogenous resources,
   a communication interface that is communicatively coupled to the plurality of heterogenous resources; and
   one or more processors that are communicatively coupled to the memory and the communication interface, wherein the one or more processors are collectively configured to:
   receive, using the communication interface, a plurality of shipment orders from a warehouse management system (WMS),
   retrieve, using the memory, the work network information for the plurality of shipment order, wherein the work network information includes information indicating a sequence of processes performed by the heterogenous resources to perform the shipping of orders
   classify work corresponding to the plurality of shipping orders into a plurality of tasks based on a first prescribed condition and the work network information,
   classify respective tasks among the plurality of tasks into a plurality of task groups based on the first prescribed condition and the work network information,
   classify respective task groups, wherein so that each of the task groups contains shipping orders with a priority that is the same, wherein and each of the plurality of task groups contains only shipping orders with a priority that is the same,
   allocate the work required to each of the plurality of tasks in the sequence of the processes,
   allocate one or more resources among the plurality of multiple types of resources to the work of each task of the plurality of task groups based on the resource information including information indicating a productivity of each of the resources for the work,
   calculate a required time for each of the work based on a quantity of the resources allocated to each of the work, the productivity, and a quantity of the shipping orders classified into the tasks,
   generate a process plan that schedules the respective work to start are started according to the sequence included in the work network information and complete completed after the required time has elapsed,
   control, using the communication interface, the plurality of heterogenous resources according to perform the process plan,
   monitor, using the communication interface, a gap between the process plan and actual progress made by the plurality of heterogenous resources, and
   when the gap satisfies a second prescribed condition, generate a new process plan for tasks among the plurality of tasks which have not been performed by the plurality of heterogenous resources.

2. The work planning system according to claim 1, wherein the one or more processors are further collectively configured to:
   classify the respective task corresponding to the plurality of shipping orders to the plurality of task groups such that proportions of the shipping orders having an attribute designated as the first prescribed condition are close to equal among within a respective task group.

3. The work planning system according to claim 2, wherein the attribute of the shipping order to be distributed among the plurality of task groups is at least one of a size of a shipping box and a presence or absence of gift wrapping.

4. The work planning system according to claim 1, wherein the one or more processors are further collectively configured to:
   classify the work corresponding to the plurality of shipping orders into the plurality of task groups such that a bias of product items to be shipped is increased based on information of the product items included in the plurality of shipping orders.

5. The work planning system according to claim 1, wherein the priority is based on a shipping time, and
wherein the one or more processors are further collectively configured to:
generate the process plan for each task in a respective task group among the plurality of task groups such that work of all processes is completed by the shipping time.

6. The work planning system according to claim 1, wherein the priority is based on information indicating whether urgent work needs to be performed or information indicating that shipping should be stopped.

7. The work planning system according to claim 1, wherein:
the work network information includes information indicating a sequence of processes for work necessary for shipping,
the resource information includes information indicating a productivity of each of the plurality of heterogenous resources in each of the processes,
the one or more processors are further collectively configured to:
calculate a required time for each of the processes based on a quantity of the plurality of heterogenous resources allocated to each of the processes, the productivity, and a quantity of the shipping orders classified into the plurality of task groups, and
generate the process plan such that respective processes are started according to the sequence included in the work network information and completed after the required time has elapsed.

8. The work planning system according to claim 7, wherein the one or more processors are further collectively configured to:
generate, for each task in a respective taskgroup among the plurality of task groups, the process plan so as to start a subsequent process before all previously started processes have been completed according to the sequence included in the work network information.

9. The work planning system according to claim 8, wherein the one or more processors are further collectively configured to:
generate the process plan such that when the subsequent process has started, a portion of the plurality of heterogenous resources allocated to the previously started processes are transitioned to the subsequent process from the previously started processes.

10. The work planning system according to claim 7, wherein the resource information includes information indicating a unit cost of each of the plurality of heterogenous resources, and
wherein the one or more processors are further collectively configured to:
generate the process plan for each task of a respective task group among the plurality of task groups so as to complete all processes by a shipping time designated for each of the shipping orders and such that a required cost is low.

11. The work planning system according to claim 1, wherein
when a new shipping order has been added, the one or more processors are further collectively configured to classify the new shipping order to any of the plurality of taskgroups or to a new task based on the first prescribed condition, and
wherein the process plan is regenerated for the shipping orders for which the process has not been started at that time.

12. The work planning system according to claim 1, wherein the one or more processors are further collectively configured to:
generate work instruction data on t of a start time of the process in the generated process plan.

13. A method that improves utilization of a plurality of heterogenous resources in a shipping system, the method comprising:
storing, in a memory, work network information pertaining to a process for work necessary for shipping, and resource information pertaining to the plurality of heterogenous resources:
receiving plurality of shipment orders from a warehouse management system (WMS),
retrieving, using the memory, the work network information for the plurality of shipment order, wherein the work network information includes information indicating a sequence of processes performed by the heterogenous resources to perform the shipping of orders;
classifying work corresponding to the plurality of shipping orders into a plurality of tasks based on a first prescribed condition and the work network information,
classifying respective tasks among the plurality of tasks into a plurality of task groups based on the first prescribed condition and the work network information;
classifying respective task groups so that each of the task groups contains shipping orders with a priority that is the same, wherein each of the plurality of taskgroups only contains shipping orders with a priority that is the same;
allocating the work required to each of the plurality of tasks in the sequence of the processes,
allocating one or more resources among the plurality of multiple types of resources to the work of each task of the plurality of task groups based on the resource information including information indicating a productivity of each of the resources for the work,
calculating a required time for each of the work based on a quantity of the resources allocated to each of the work, the productivity, and a quantity of the shipping orders classified into the tasks,
generating a process plan that schedules the work to start according to the sequence included in the work network information and complete after the required time has elapsed,
controlling the plurality of heterogenous resources according to perform the process plan,
monitoring a gap between the process plan and actual progress made by the plurality of heterogenous resources, and
when the gap satisfies a second prescribed condition, generating a new process plan for tasks among the plurality of tasks which have not been performed by the plurality of heterogenous resources.

14. The work planning system according to claim 1, wherein the plurality of heterogenous resources include at least one robot.

15. The work planning system according to claim 1, wherein the plurality of heterogenous include at least one of a plurality of worker terminals or a plurality of material handling devices.

16. The method according to claim 13, wherein the plurality of heterogenous include at least one robot.

17. The method according to claim 13, wherein the plurality of heterogenous include at least one of a plurality of worker terminals or a plurality of material handling devices.

* * * * *